United States Patent
Watanabe et al.

(10) Patent No.: US 11,847,097 B2
(45) Date of Patent: Dec. 19, 2023

(54) OPTIMIZING FILE RECALL FOR MULTIPLE USERS

(71) Applicant: International Business Machines Corporation, Armonk, NY (US)

(72) Inventors: Junta Watanabe, Tokyo (JP); Yuka Sasaki, Kawasaki (JP); Reiya Takemura, Ichihara (JP); Tatsuki Sawada, Matsudo (JP)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 17/304,266

(22) Filed: Jun. 17, 2021

(65) Prior Publication Data
US 2022/0405247 A1    Dec. 22, 2022

(51) Int. Cl.
| | |
|---|---|
| G06F 17/00 | (2019.01) |
| G06F 7/00 | (2006.01) |
| G06F 16/17 | (2019.01) |
| G06F 16/185 | (2019.01) |
| G06F 11/34 | (2006.01) |
| G06F 16/735 | (2019.01) |
| G06F 16/74 | (2019.01) |

(52) U.S. Cl.
CPC ...... *G06F 16/1734* (2019.01); *G06F 11/3438* (2013.01); *G06F 16/185* (2019.01); *G06F 16/735* (2019.01); *G06F 16/74* (2019.01)

(58) Field of Classification Search
CPC .... G06F 16/1734; G06F 16/74; G06F 16/735; G06F 16/185; G06F 11/3438
USPC ........................................................ 707/634
See application file for complete search history.

(56) References Cited

U.S. PATENT DOCUMENTS

| | | | |
|---|---|---|---|
| 9,323,462 B2 | 4/2016 | Olson | |
| 10,416,919 B1 * | 9/2019 | Cai | ............... G06F 3/0685 |
| 10,552,081 B1 | 2/2020 | Steinhauer | |
| 2012/0054333 A1 * | 3/2012 | Vichare | ............... G06F 9/5011 |
| | | | 709/224 |

(Continued)

FOREIGN PATENT DOCUMENTS

JP    2016071601 A    5/2016

OTHER PUBLICATIONS

"Automatic Data Migration and Recall Method while Optimizing Storage Cost", IP.com PAD, IPCOM000261432D, Publication Date, Mar. 2, 2020, 4 pages, <https://priorart.ip.com/IPCOM/000261432>.

(Continued)

*Primary Examiner* — Pavan Mamillapalli
(74) *Attorney, Agent, or Firm* — Joseph P. Curcuru (57) ABSTRACT

In an approach to improve file recall between storage devices by optimizing file recall for multiple users. Embodiments of the present invention obtain one or more similarities among one or more users based on one or more usage points and divide the one or more users into a plurality of clusters based on a content of the one or more usage points. Further, embodiments select a cluster from the plurality of clusters based on cluster importance, and select the content used by more than a predetermined percentage of the weighted users pertaining to the selected cluster as an automated recall subject. Additionally, embodiments recal one or more selected content from a secondary storage device to a primary storage device.

20 Claims, 8 Drawing Sheets

(56) References Cited

U.S. PATENT DOCUMENTS

| | | | | |
|---|---|---|---|---|
| 2017/0154037 A1* | 6/2017 | Kozina | ............... | G06F 16/214 |
| 2018/0101546 A1* | 4/2018 | Krasnow | ............. | G06F 16/1734 |
| 2018/0260398 A1* | 9/2018 | Faibish | ............... | G06F 16/122 |
| 2020/0026784 A1 | 1/2020 | Miyoshi | | |
| 2020/0364179 A1 | 11/2020 | Khinvasara | | |
| 2023/0040574 A1* | 2/2023 | Cai | ..................... | G06F 3/0653 |

OTHER PUBLICATIONS

"One Time Grouping Recall Based on Statistical Analysis for File Accessing Timestamp", An IP.com Prior Art Database Technical Disclosure, IP.com No. IPCOM000188468D, IP.com Electronic Publication Date: Oct. 9, 2009, 4 pages.

Disclosed Anonymously, "System and Method for a Owner, File Type and Directory Specific HSM Migration Policy Optimization", an IP.com Prior Art Database Technical Disclosure, IP.com, No. IPCOM000258925D, IP.com Electronic Publication Date: Jun. 26, 2019, 10 pages.

\* cited by examiner

FIG. 1

| | 5 DAYS BEFORE | 4 DAYS BEFORE | 3 DAYS BEFORE | 2 DAYS BEFORE | 1 DAY BEFORE |
|---|---|---|---|---|---|
| FILE 1 | 1 | 2 | 3 | 4 | 5 |
| FILE 2 | 5 | 4 | 3 | 2 | 1 |
| WEIGHT | 1 | 2 | 3 | 4 | 5 |

FIG. 2

| USER/FILE | FILE 1 | FILE 2 | FILE 3 | FILE 4 |
|---|---|---|---|---|
| USER A | 5 | 8 | 0 | 2 |
| USER B | 0 | 0 | 7 | 0 |
| USER C | 0 | 1 | 1 | 11 |
| USER D | 6 | 7 | 0 | 2 |

OPTIMIZING FILE RECALL FOR MULTIPLE USERS

BACKGROUND OF THE INVENTION

The present invention relates generally to the file recall, and more particularly to recalling files stored in a secondary storage device to a primary storage device.

Hierarchical Storage Management (hereinafter referred to as HSM) is an architecture that has been widely used to combine storage devices with different performances to store frequently used data in a relatively high—speed and high—cost primary storage device and store infrequently used data in a relatively low—speed and low—cost secondary or lower storage medium such as tape storage. An advantage of HSM includes the reduction of data storage cost which is realized by data arrangement optimization. Moving data from the primary storage device to the secondary storage device is called "migration," and moving data from the secondary storage device to the primary storage device is called "recall" in this architecture. HSM has been developed with the goal of enabling users of platforms using HSM (hereinafter referred to as "users") to use the platforms without being conscious of where the data comes from, or if the file is migrated or recalled when they access data.

SUMMARY

Embodiments of the present invention disclose a method, a computer program product, and a system for optimizing file recall for multiple users, the computer-implemented method comprising: obtaining one or more similarities among one or more users based on one or more usage points; dividing the one or more users into a plurality of clusters based on a content of the one or more usage points; selecting a cluster from the plurality of clusters based on cluster importance, wherein the cluster importance is obtained by analyzing the one or more users pertaining to the cluster and a ratio of weighted users; selecting the content used by more than a predetermined percentage of the weighted users pertaining to the selected cluster as an automated recall subject; and recalling one or more selected content from a secondary storage device to a primary storage device.

DETAILED DESCRIPTION

Embodiments of the present invention recognize that when managing HSM, the HSM administrator (hereinafter referred to as the "administrator") defines "policies" as rules which determine what kind of data should be stored in ether the primary storage device or the secondary storage device. For example, moving files that have not been accessed for the past 120 days to the secondary storage device. Since these policies are statically set in general (e.g., predetermined), the policies need to be re-optimized manually whenever HSM operation is changed. However, optimizing said polices requires a specialized knowledge, thus leaving a technical problem in the art. For example, in a video streaming service where HSM is used in a platform involving multiple users, to lower the storage managing cost, a policy was created to frequently move files to the secondary storage device. When this policy is applied, many files are supposed to be stored in the secondary storage device. Thus, if the primary storage device does not have a file demanded by a user, then the file needs to be recalled actively to satisfy the demand of a user. The operation, in this example, will increase file reading time, which may affect a user's waiting time. Particularly, when tape media is used as the secondary storage device, frequently repeated recalls will result in accelerating deterioration of device. To prevent the issues stated above multiple files should be recalled in one operation. Nonetheless, if multiple files including a file with no demand are carelessly recalled onto a primary storage device, the multiple files would not only consume the capacity of the primary storage device, but also may cause a financial burden or other damages to the platform provider (hereinafter referred to as the "provider"). It should be noted that a file, also referred to as content, may be any type of file known and understood in the art.

Moreover, embodiments of the present invention recognize that video-sharing services or content curation sites often use recommendation engines to prevent users from leaving or to increase a view count and time spent on the video-sharing and/or content curation sites. Embodiments of the present invention recognize that due to a lack of speed to obtain a file during video reproduction, recommending a file through tape storage is not an efficient option. Further, embodiments of the present invention recognize that for user convenience, the recommendation of contents placed on a high-speed storage device makes the operation faster; however, high-speed storage requires relatively high monetary cost. Therefore, as site contents increase with an increasing number of users having diversified preferences, site and content providers will be confronted with a choice of either having optimal content recommendations with higher cost or reduced storage cost with insignificant content recommendations.

Furthermore, embodiments of the present invention recognize that the same could be said for services with the presence of past archived data (e.g., cloud storage service and cloud mail service). The archived data in services such as cloud storage service and cloud mail service are ideally stored in secondary storage device. However, if HSM is managed with polices where recall is performed every time a user requests a file, the result will not only accelerate the deterioration of the secondary storage device but also increase the amount of time spent obtaining the file. Embodiments of the present invention recognize that while appropriate policy setting plays an important role in HSM management, changing policies based on the manner of data usage by complicatedly changing multiple users requires technical knowledge and experience. Embodiments of the present invention recognize that it is also difficult to optimize policies while taking account of the policies used in obtaining the file and the proposing tools such as recommendation engines.

Embodiments of the present invention improve the current art and solve the problems stated above by optimizing file recall for multiple users through executing, by an HSM, an automated recall function based on a users' file usage history in services involving multiple users. Embodiments of the present invention improve the current art and solve the problems stated above by dividing multiple users into clusters based file usage histories of multiple users and predicting which files will be used in the future with the user information of each cluster.

More specifically, embodiments of the present invention improve the current art and solve the problems stated above by recalling files (e.g., contents) stored in a secondary storage device (e.g., one or more tape storage devices) to a primary storage device (e.g., one or more disk storage devices) by determining a candidate file for automated recall, based usage histories of files pertaining to a selected cluster and capacity of the primary storage device for reducing access time of requested files. Further, embodiments of the present invention improve the current art and solve the problems stated above by (i) obtaining a usage count of each content by each user within a fixed period and assigning a usage point to one or more used content based on the obtained usage count, (ii) obtaining one or more similarities among users based on the usage point and dividing the users into a plurality of clusters based on the one or more content usage points; (iii) selecting one or more clusters from the plurality of clusters based on cluster importance, wherein the cluster importance is obtained by analyzing and/or aggregating any one of the number of users pertaining to a cluster and the ratio of excellent users (i.e., weighted users), (iv) selecting content used by more than a predetermined percentage of the users pertaining to the selected cluster as an automated recall subject, and (v) recalling the selected content from the secondary storage device to the primary storage device, wherein the usage point is a point of usage as it is known and understood in the art.

Implementation of embodiments of the invention may take a variety of forms, and exemplary implementation details are discussed subsequently with reference to the Figures (i.e., FIG. 1-FIG. 8).

Figure 1:
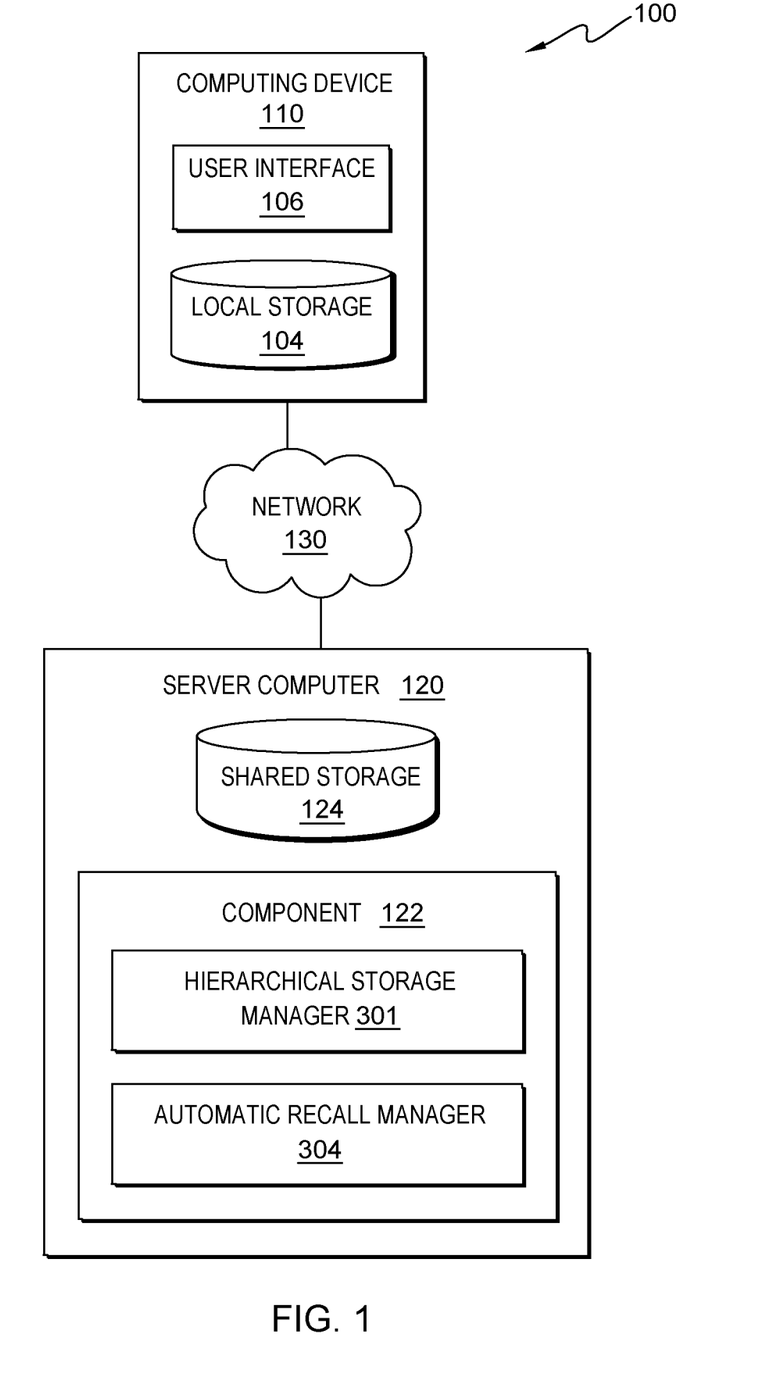
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of interfaces 106. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 8.

User interface (interface) 106 provides an interface to content recall component (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 8 In some embodiments server computer 120 may represent a plurality of server computers.

Each of shared storage 124 and local storage 104 may be a data/knowledge repository and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory. In various embodiments, not depicted in FIG. 1, in addition to shared storage 124, server computer comprises a primary and a secondary database, described below in FIG. 3. The primary database, also referred to as primary storage device, may be one or more of any type of disk storage known in the art. The secondary database, also referred to as secondary storage device, may be one or more any type of tape storage known in the art.

In the depicted embodiment, component 122 is executed on server computer 120. In other embodiments, component 122 may be executed on computing device 110. In various embodiments of the present invention, not depicted in FIG. 1, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer 120, via network 130. In the depicted embodiment, component 122 comprises hierarchical storage manager (HSM) 301 and automatic (auto) recall manager 304.

Component 122 may divide users into clusters based on the file usage history of a user. In various embodiments, component 122 stores and retrieves user file usage data (i.e., user file usage history) on and from shared storage 104. Component 122 may determine file candidates subjected to automated recall based on the number of users pertaining to a cluster and the ratio of specific users. In various embodiments, component 122 executes clustering so that current trend of users can be understood. For example, executing clustering at the initiation of a program so component 122 collects user data to collect and understand user trends (e.g., file usage history of a user). In some embodiments, usage history of past files are stored in secondary database (depicted as secondary storage device 303 in FIG. 3).

In various embodiments, component 122 recalls content stored in a secondary storage device to a primary storage device by (i) dividing users into a plurality of clusters based on contents (i.e., file) usage history; (ii) selecting one or more cluster from the plurality of clusters based on cluster importance, (iii) selecting a content used by more than a predetermined percentage of users pertaining to the selected cluster as an automated recall subject, and (iv) recalling the selected content from the secondary storage device to the primary storage device. Component 122 may divide users into a plurality of clusters based on retrieved or collected (i.e., obtained) one or more usage counts associated with one or more contents from the one or more users within a predetermined period of time, assign one or more usage points to the one or more contents used by each user based on the obtained usage count, and identify one or more similarities among users based on the usage points and dividing the users into a plurality of clusters based on the obtained similarities. In some embodiment, component 122 may obtain cluster importance by analyzing and/or aggregating any one of the number of users pertaining to a cluster and the ratio of users that exceed a predetermined threshold.

Figure 2:
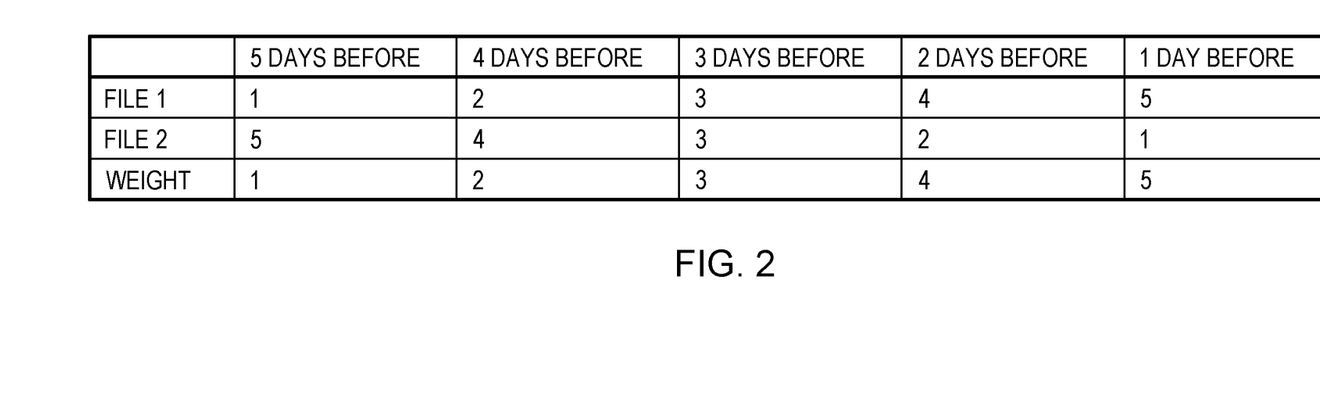
FIG. 2 is an example of file usage count outlined in a table, in accordance of an embodiment of the present invention.

Component 122 may perform clustering by creating a matrix of usage points of respective users and files based on a usage count of each file by each user within a most recent fixed period of time, wherein the fixed period of time is predetermined. For usage points, a usage count may be used as it is or the most recent fixed period may be divided into several periods within each usage count, wherein each usage count is weighted and combined to emphasize more recent histories. For example, during a five day period user A used file 1 and file 2 in the manner depicted in FIG. 2. FIG. 2 depicts an example of file usage count outlined in a table, in accordance with an embodiment of the present invention. In the example illustrated in FIG. 2, despite files 1 and 2 having the same usage counts for a five day period, usage points of file 1 amount to 55 (i.e., $1 \times 1 + 2 \times 2 + 3 \times 3 + 4 \times 4 + 5 \times 5 = 55$), whereas the usage points of the file 2 amount to 35 (i.e., $5 \times 1 + 4 \times 2 + 3 \times 3 + 2 \times 4 + 5 \times 1 = 35$).

Figure 3:
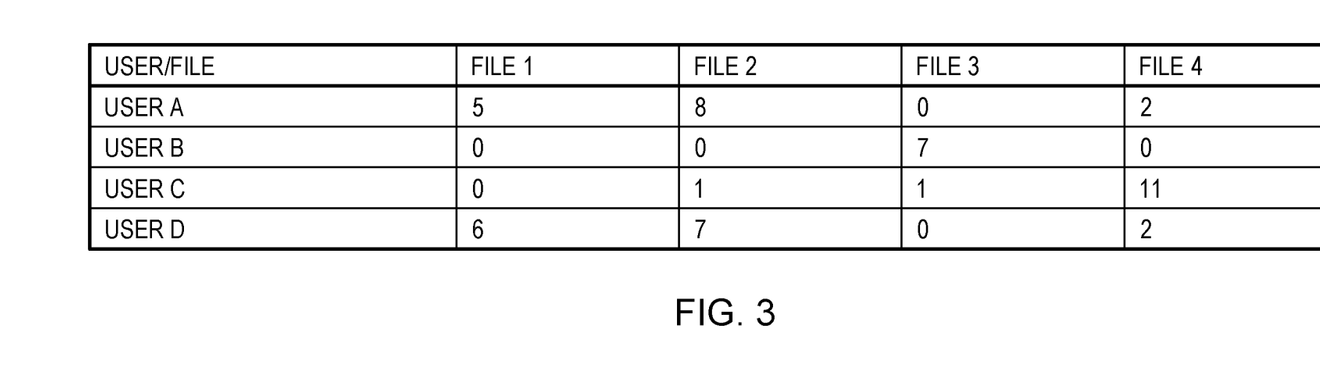
FIG. 3 is an example of a completed matrix, in accordance of an embodiment of the present invention.

In various embodiments, a vector for usage points of each file by each user is created to calculate one or more similarities among users so that users with a similarity above or within a predetermined range are consolidated into a common cluster. Users may overlap across one or more clusters. For example, in FIG. 3 users A and D are consolidated into a common cluster based on the similarity in file usage history. FIG. 3 illustrates one embodiment of a completed matrix, in accordance with an embodiment of the present invention. Note that the matrix method is accompanied by increased calculation costs with an increase in the number of users and files so that users with similar preference may be consolidated beforehand to reduce rows or similar files may be consolidated to reduce columns. In various embodiments, a large number of users and files will result in a sparse matrix and therefore re-expression of a matrix by a method such as compressed row storage may lead to reduction in the amount of calculation.

Component 122 may select files to be recalled as indicated below in step 608 of FIG. 6. In various embodiment, candidate files or automated recall files are selected based on the file usage history of one or more users stored in the user's file access history DB (see user's file access history database 305 in FIG. 3) (hereinafter referred to as the DB), the users' cluster C_i created by component 122 during the clustering of users, and other available information known in the art.

In various embodiments, assuming that importance of each cluster is C-Importance_i, a cluster C_i exceeding a certain value of C-Importance_i is selected. An expression to provide C-Importance_i is described below in Equation 1.

$$C\text{-Importance}\_i = \text{*weight}\_1) + (\text{value}\_2 \text{*weight}\_2) + (\text{value}\_3 \text{*weight}\_3) + (\text{value}\_n \text{*wight}\_n)$$  Equation 1:

Where value_n is an important element to determine C-Imporatance_i and weight_n is a weight of value_n of each element. In various embodiments, the values used as value_n vary depending on operation environment and service nature. For example, the number of particularly prioritized users (value_n) and the importance weight thereof (weight_n), the number of users pertaining to a cluster (value_n) and the importance weight thereof (weight_n), and the number of particularly prioritized files (value_n) and the number of users referring to such files (weight_n). It is important to note that elements required for calculation of C-Imporatance_i are selected according to the priority demanded by the platform provider. This is desirably specified by the HSM administrator with technical knowledge beyond a certain level according to hearing from the provider. In some embodiments, the elements required for calculation of C-Imporatance_i are predetermined.

The administrator selects files to recall after calculation of C-Imporatance_i of each cluster, based on the capacity determined by the administrator in a range without exceeding an upper limit value of use of the primary storage device, from a group of candidate files used by the users' clusters C_i corresponding to C-Imporatance_i. The identified files (i.e., files identified for recall) can be defined as files used by more than a certain percentage of users within the users' cluster 201, wherein the certain percentage is a predetermined percentage or predetermined percentage range. For example, an identified file is a video file that is used by at least 55% of the users within a cluster. It is also desirable for the administrator to set the selection of files to recall so as to comply with the priority demanded by the provider in the same manner as value_n and weight_n. Selected files may also be recalled from the secondary storage device to the primary storage device at any time determined by the administrator. In some embodiments, the selected files are recalled from the secondary storage device to the primary storage device based on one or more predetermined criteria (e.g., priority, time, request, and/or any other criteria known in the art).

Figure 4A:
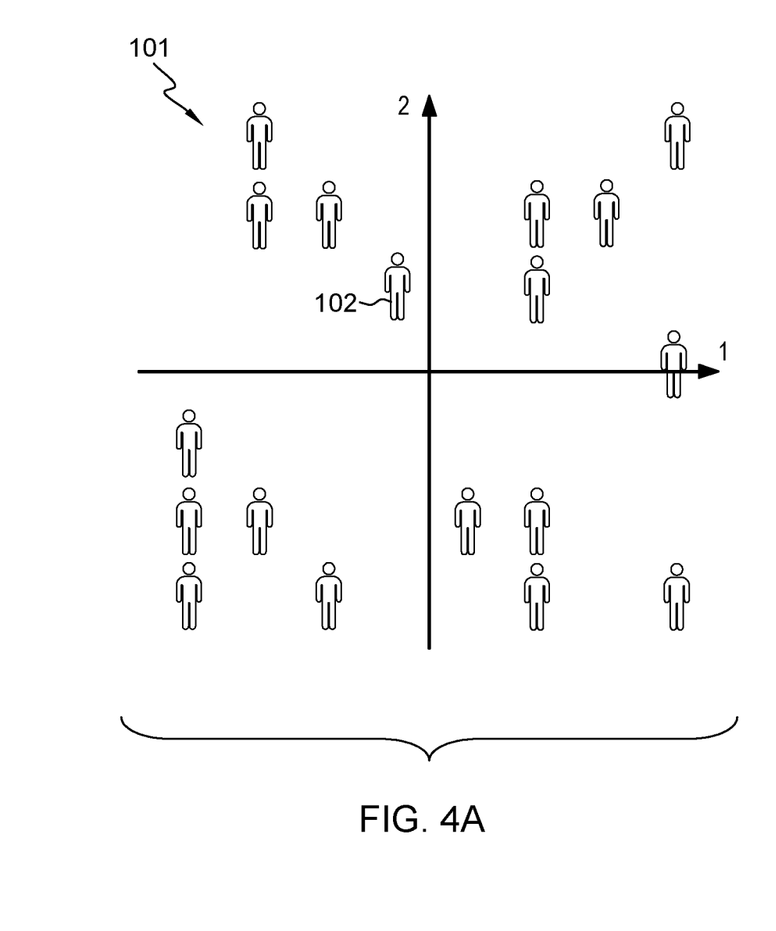
FIG. 4A is an example of a scatter diagram of users, in accordance with an embodiment of the present invention.
Figure 4B:
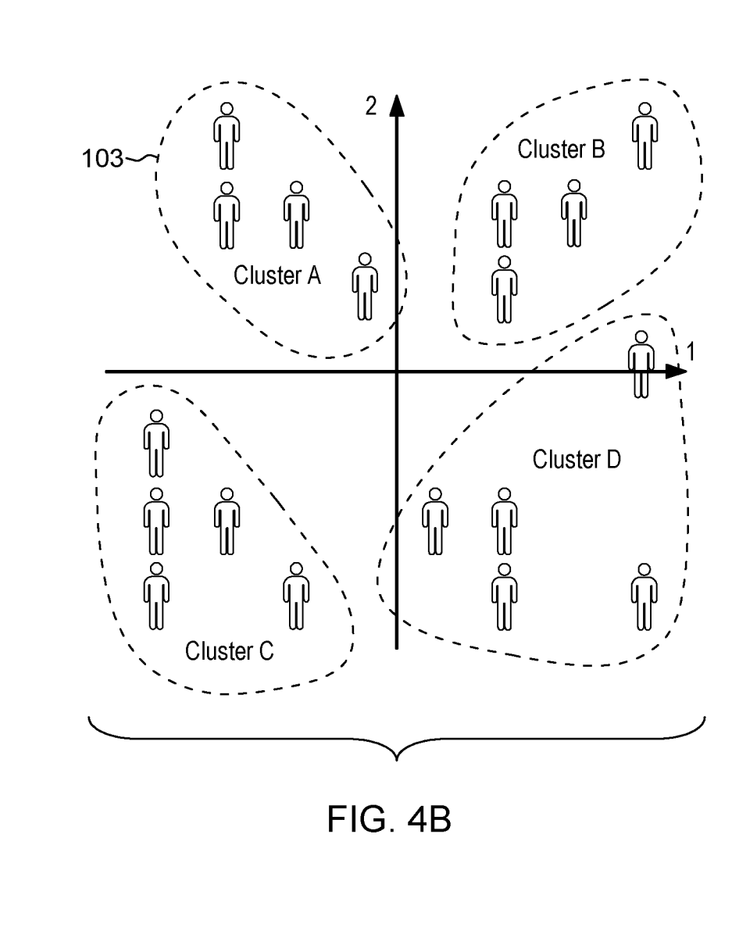
FIG. 4B is an example of user clustering, in accordance with an embodiment of the present invention.

In various embodiments, component 122 divides users into clusters, as shown in FIGS. 4A and 4B. FIGS. 4A and 4B depict an outline of an example of a method for clustering users according to one embodiment of the present invention. More specifically, FIG. 4A shows a state where user 102 is plotted on scatter diagram 101 of a multidimensional space, in which each axis shows a certain volume used to express features of user 102. In various embodiments, the volumes shown on each axis are set freely by the platform provider or predetermined. For example, in the case of a video streaming platform, volumes such as a cumulative view count of a certain video and a view count within a fixed time period by user 102 are be adopted. FIG. 4B represents a state where user 102 was classified into cluster 103 with several users by applying clustering to the scatter diagram 101 of FIG. 4A. A method for clustering may be set freely by the platform provider or may be predetermined. For example, clustering algorithms such as k-means method, as it is known and understood in the art, may be used or a method for clustering may be defined manually.

Figure 4C:
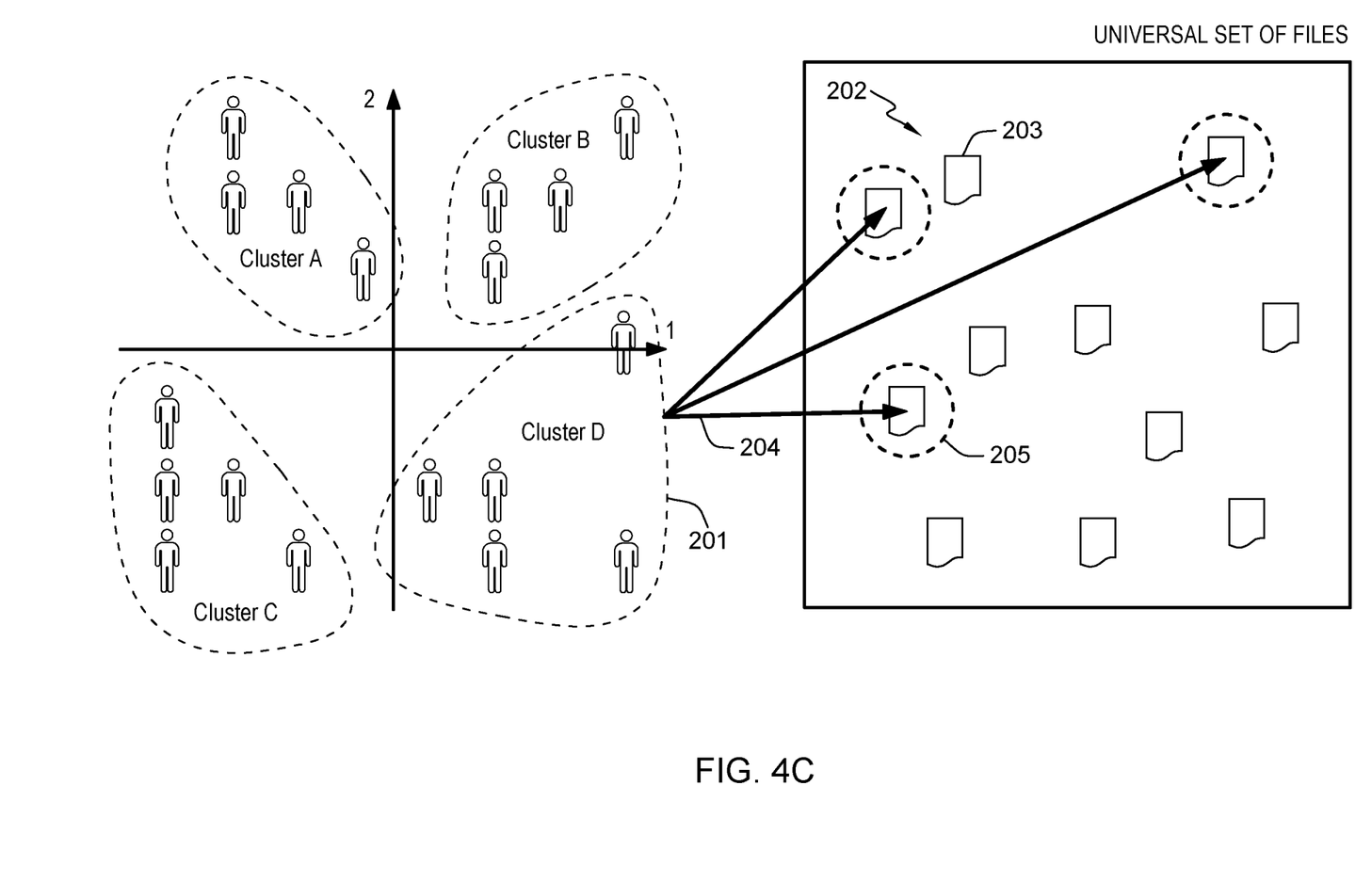
FIG. 4C is an example of file group selection based on user clusters, in accordance with an embodiment of the present invention.

Component 122 may determine file groups as candidates for automated recall, as depicted in FIG. 4C. FIG. 4C illustrates an embodiment depicting the selection of file groups based on the cluster of users (i.e., user clusters), in accordance with one embodiment of the present invention. In various embodiments, component 122 selects one or more user clusters from a group of clusters of users. In FIG. 4C, cluster 201 is the selected one or more user cluster. Component 122 may use cluster importance to select one or more user cluster. Cluster importance is defined by the platform provider with the use of volumes (e.g., the number of cluster members and the ratio of weighted users). In various embodiments, weighted users are users that have a predetermined or assigned weight that is heavier than other users in a particular cluster. In some embodiments, weighted users a predetermined users with a predetermined weight. Based on the selected user cluster 201, component 122 identifies a group of files as candidates for automated recall. Specifically, files 203 comprised in universal set of files 202 are linked to the selected user cluster (i.e., cluster 201). File association 204 represents the association of files 203 linked to the user cluster 201. The criteria to apply such association can be determined freely by the platform provider (i.e., the criteria to apply association between files is predetermined). For example, the association may be determined by a file used by more than a certain percentage of users in user cluster 201. Files 205 linked to cluster 201 are set as candidates for automated recall.

In the example, depicted in FIG. 4C, component 122 determines a group of files to be actually processed by automated recall based on one or more candidate files (e.g., files 205) for automated recall. Determination of a group of files to be processed by automated recall may be set freely by the platform provider or based on predetermined factors (i.e., criteria). For example, in the case of video streaming service, a method may be adopted to select a file with higher importance by analyzing criteria such as an advertising revenue and a view count. In various embodiments of the present invention, reduction of opportunity loss to the platform provider is anticipated owing to automated recall of files with high importance. Component 122 may be used for the case of sharing a large volume of data by participating members in a video site or similar sites known in the art. Component 122 improves the art by providing shorter read time.

Figure 5:
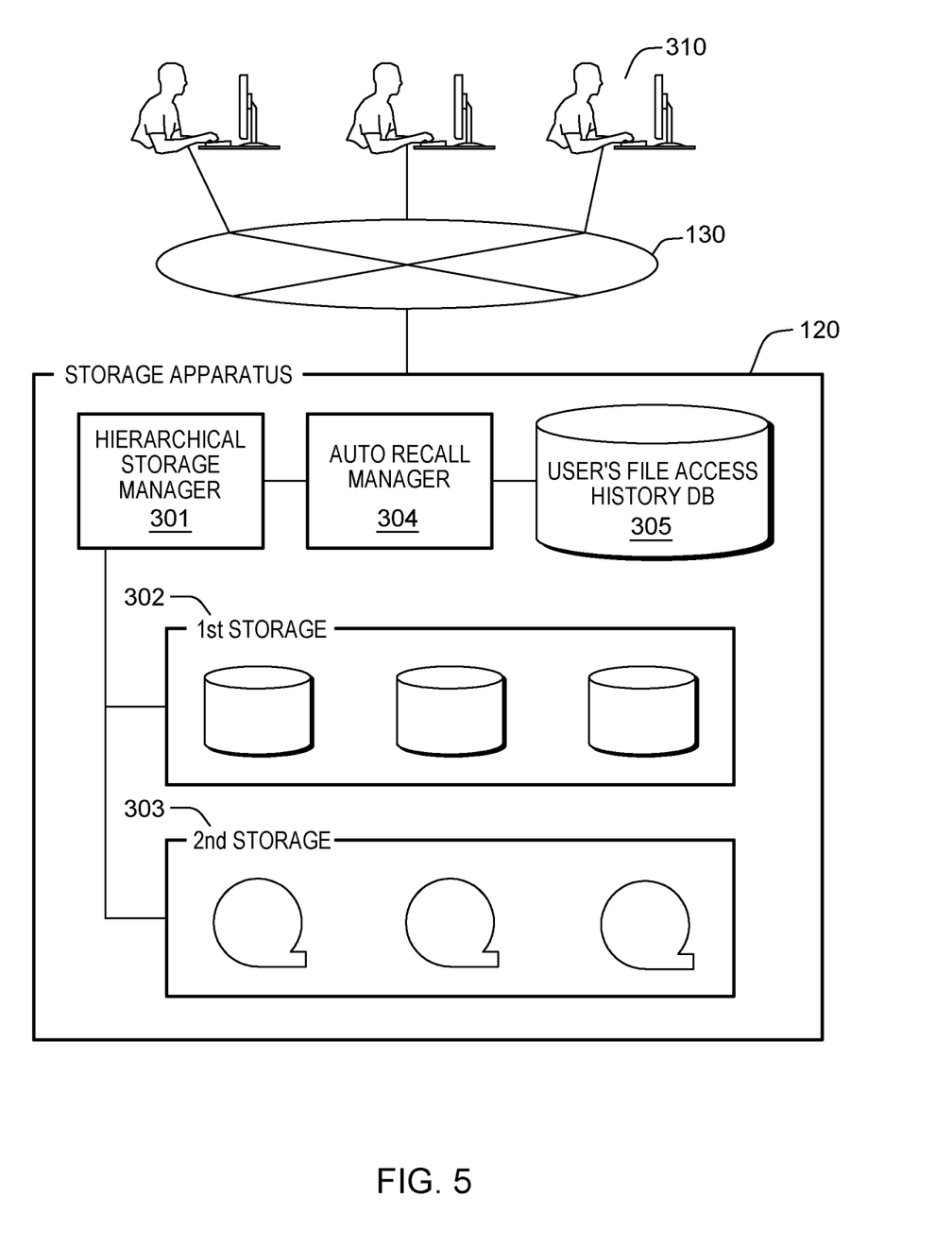
FIG. 5 is a functional block diagram illustrating a content recall component, in accordance with an embodiment of the present invention.

FIG. 5 depicts a configuration example of a recall system based on user content usage history, in accordance with an embodiment of the present invention. The embodiment shown in FIG. 5 is a hierarchical storage system (storage apparatus 306) using primary storage device (storage) 302 and a secondary storage device (e.g., storage) 303 and controlled by HSM 301. Storage 302 may comprise one or more disk drives for storing data with high usage frequency and/or may be similarly defined under local storage 104 and/or shared storage 124. Storage 303 serves as one or more tape libraries having a plurality of tape cartridges for storing data with low usage frequency. In this example, auto recall manager 304 and user's file access history database (DB) 305 are mounted separately from HSM 301. In various embodiments, component 122, via HSM 301, collects user file usage history from users 310 and stores the collected user data on user file access history DB 305, through network 130. Component 122, via HSM 301 may tag collected user data (e.g., user file access history) with a unique identification tag and/or rank and sort the collected user data based on the predefined criteria. Auto recall manager 304 may instruct HSM 301 to recall files by determining files subjected to automated recall from users' file usage histories. User's file access history DB 305 represents database for managing users' file usage histories. In various embodiments, component 122 displays, via interface 106, the recalled files to one of more users 310.

Figure 6:
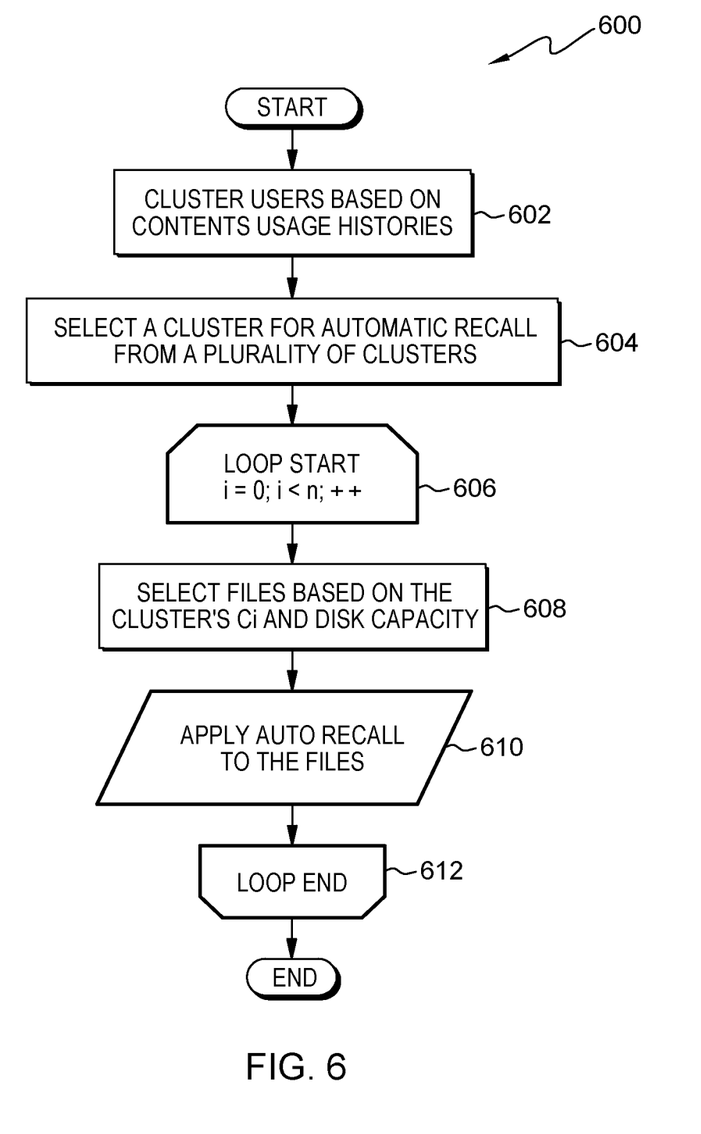
FIG. 6 illustrates operational steps of the content recall component, on a server computer within the distributed data processing environment of FIG. 1, for recalling files stored on a secondary storage device to a primary storage device, in accordance with an embodiment of the present invention.

FIG. 6 illustrates operational steps of component 122, generally designated 600, in communication with server computer 120 and/or computing device 110, within distributed data processing environment 100 of FIG. 1, for determining a file subjected to automated recall based on users' contents usage history, in accordance with an embodiment of the present invention. FIG. 6 provides an illustration of one implementation and does not imply any limitations with regard to the environments in which different embodiments may be implemented. Many modifications to the depicted environment may be made by those skilled in the art without departing from the scope of the invention as recited by the claims.

In step 602, component 122 clusters users based on usage history contents. In various embodiments, component 122 divides users based on a users' file usage histories into one or more clusters. Component 122 may retrieve, via HSM 301, the usage histories of one or more users from user's file access history DB 305.

In step 604, component 122 selects one or more clusters for automated recall. In various embodiments, component 122 selects one or more clusters for automated recall based on the importance (e.g., Equation 1) of each of the user clusters, wherein the importance of each user cluster is calculated, through Equation 1, to select an important cluster. The prioritization values and prioritization value weights are defined by the user. For example, a user might prioritize silver class membership accounts as a "more important" (i.e., more heavily weighed) value than regular memberships, thus the weight of silver class membership may be heavier than the weight of regular class memberships. In another example, if a certain cluster tends to consist of more active users than other clusters then the cluster with more active users is prioritized. The value in this case will be the "the number of active users", and the weight might be just less than the weight of the silver or gold class membership accounts. In some embodiments the prioritization value weights are predefined.

In step 606, component 122 executes a loop. In various embodiments, component 122 starts a loop using Equation 2. In various embodiments, the loop cycles through the i-th user cluster that was selected and/or subjected to automated recall, further described below. For example, when there are 3 out of 10 cluster which is subjected to automated recall, n=3, i=1~3 (C1, C2, and C3).

$$i=0; i<n; i++$$ Equation 2:

In step 608, component 122 selects files based on the user's cluster and disk capacity. In various embodiments of the present invention, component 122 selects a candidate file for automated recall based on the file usage histories of users pertaining to a selected cluster and the capacity of the primary storage device. In various embodiments is the i-th users' cluster and n represents the number of users' clusters subjected to automated recall.

In step 610, component 122 applies the automated recall to the selected files. In various embodiments, a selected group of files is transmitted to historical storage manager 301 via auto recall manager 304, wherein the automated recall is executed upon determination by historical storage manager 301.

In step 612, component 122 ends the loop. In various embodiments, component 122 terminates the loop and executes the automated recall on the selected files. In some embodiments, component 122 displays the selected files to one or more users, via interface 106. In other embodiments, component 122 issues a responsive prompt, via interface 106, alerting a user that the loop has ended and prompts the user to select one or more options. For example, issuing a responsive prompt stating that the loop has been terminated and prompting the user to select to either accept the selected files or repeat the loop.

Figure 7:
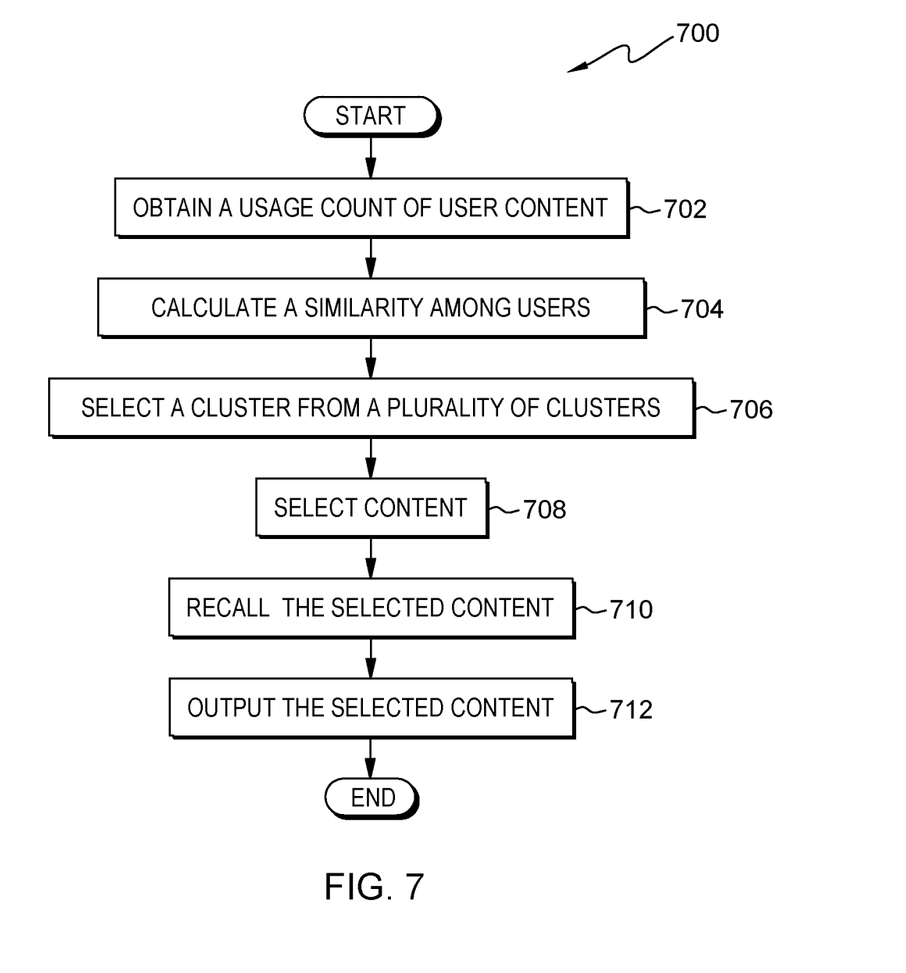
FIG. 7 illustrates operational steps of the content recall component, on a server computer within the distributed data processing environment of FIG. 1, for recalling files stored on a secondary storage device to a primary storage device, in accordance with an embodiment of the present invention.

FIG. 7 illustrates operational steps of component 122, generally designated 700, in communication with server computer 120 and/or computing device 110, within distributed data processing environment 100 of FIG. 1, for optimizing file recall for multiple users by recalling files stored on a secondary storage device to a primary storage device, in accordance with an embodiment of the present invention. FIG. 7 provides an illustration of one implementation and does not imply any limitations with regard to the environments in which different embodiments may be implemented. Many modifications to the depicted environment may be made by those skilled in the art without departing from the scope of the invention as recited by the claims.

In step 702, component 122 obtains a usage count of user content. In various embodiments of the present invention, component 122 obtains the usage count of user content for a plurality of users. In some embodiments, component 122 obtains usage count of each content by each user within a predetermined period of time and assigning a usage point to each content used based on the obtained usage count.

In step 704, component 122 calculates the similarity among users. In various embodiments, component calculates the one or more similarities among a plurality users based on the usage point and divides the users into a plurality of clusters based on contents usage points and calculated similarities.

In step 706, component 122 selects a cluster from the plurality of clusters. In various embodiments, component 122 selects one or more clusters from the plurality of clusters based on cluster importance, wherein the cluster importance is obtained by analyzing and/or aggregating any one of the number of users pertaining to a cluster and the ratio of users that exceed a predetermined threshold.

In step 708, component 122 selects content used more than a predetermined percentage of users. In various embodiments, component 122 selects content used by more than a predetermined percentage of the users pertaining to the selected cluster as an automated recall subject. In some embodiments, component 122 generates a ranked list of selected content and displays a responsive prompt detailing the generated list to one or more users, via interface 106, wherein the responsive prompt requests the user confirms, rejects, or customizes the generated ranked list of selected content. Responsive to receiving a response from the user, via interface 106, component 122 either confirms and carries on with the generated list, repeats steps 702-708 to refresh the list, or enables the user to customize and confirm the generated list.

In step 710, component 122 recalls the selected content. In various embodiments, component 122 recalls the selected content from the secondary database to the primary database. In various embodiments, component 122, during recall, moves the selected content from storage 303 (e.g., tape storage device) to storage 302 (e.g., disk storage device). After recalling the content, users may access and use the content via interface 106 on computing device 110. In various embodiments, when the recalled content becomes disused, component 122 migrates the content (e.g., moves the content from the disk storage back to the tape storage).

In step 712, component 122, component outputs the selected content. In various embodiments, component 122, via interface 106, outputs the selected content to one or more users.

Figure 8:
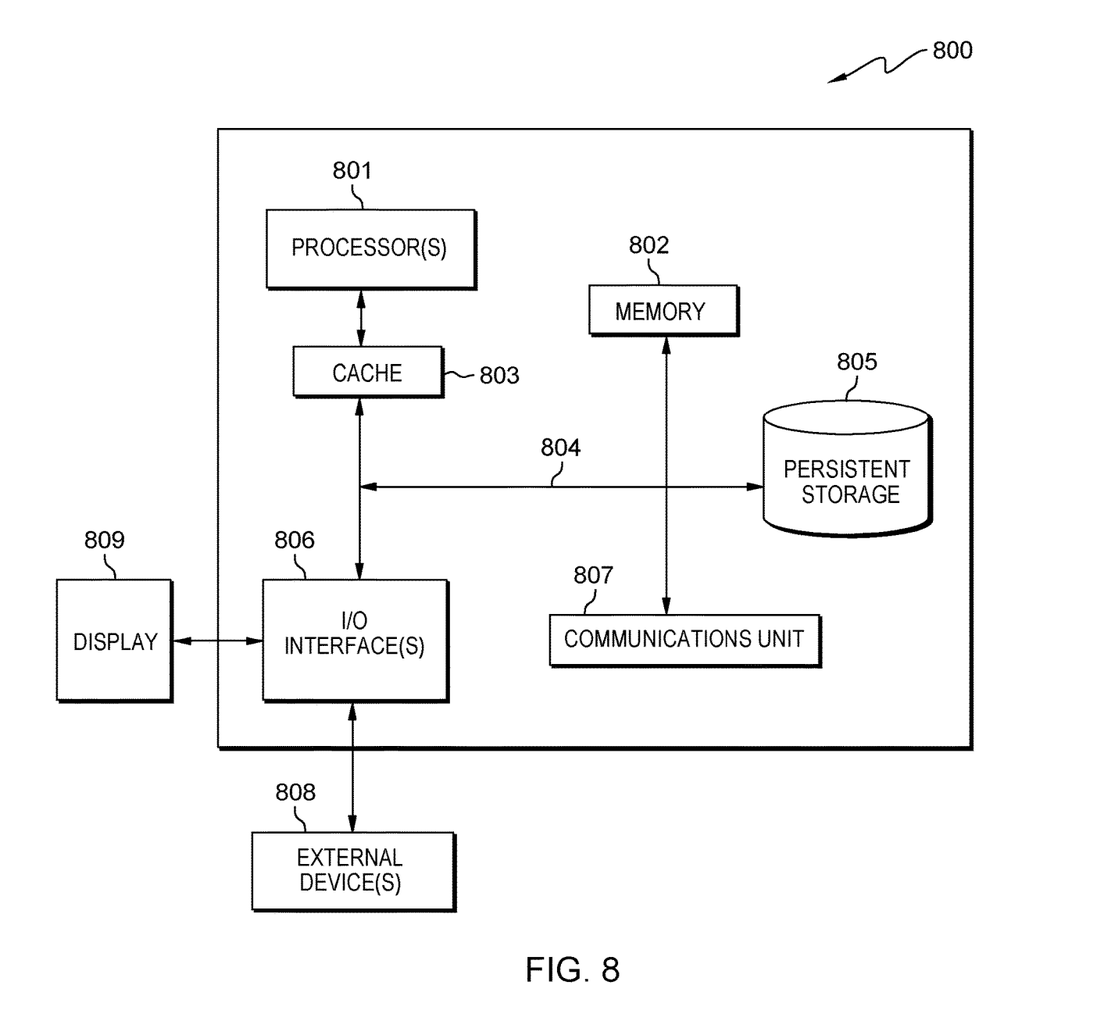
FIG. 8 depicts a block diagram of components of the server computer executing the modification component within the distributed data processing environment of FIG. 1, in accordance with an embodiment of the present invention.

FIG. 8 depicts a block diagram of components of server computer 120 within distributed data processing environment 100 of FIG. 1, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

FIG. 8 depicts computer system 800, where server computing 120 represents an example of computer system 800 that includes component 122. The computer system includes processors 801, cache 803, memory 802, persistent storage 805, communications unit 807, input/output (I/O) interface(s) 806, display 809, external device(s) 808 and communications fabric 804. Communications fabric 804 provides communications between cache 803, memory 802, persistent storage 805, communications unit 807, and input/output (I/O) interface(s) 806. Communications fabric 804 may be implemented with any architecture designed for passing data and/or control information between processors (such as microprocessors, communications, and network processors, etc.), system memory, peripheral devices, and any other hardware components within a system. For example, communications fabric 804 may be implemented with one or more buses or a crossbar switch.

Memory 802 and persistent storage 805 are computer readable storage media. In this embodiment, memory 802 includes random access memory (RAM). In general, memory 802 may include any suitable volatile or non-volatile computer readable storage media. Cache 803 is a fast memory that enhances the performance of processors 801 by holding recently accessed data, and data near recently accessed data, from memory 802.

Program instructions and data used to practice embodiments of the present invention may be stored in persistent storage 805 and in memory 802 for execution by one or more of the respective processors 801 via cache 803. In an embodiment, persistent storage 805 includes a magnetic hard disk drive. Alternatively, or in addition to a magnetic hard disk drive, persistent storage 805 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 805 may also be removable. For example, a removable hard drive may be used for persistent storage 805. Other examples include optical and magnetic disks, thumb drives, and smart cards that are inserted into a drive for transfer onto another computer readable storage medium that is also part of persistent storage 805.

Communications unit 807, in these examples, provides for communications with other data processing systems or devices. In these examples, communications unit 807 includes one or more network interface cards. Communications unit 807 may provide communications through the use of either or both physical and wireless communications links. Program instructions and data used to practice embodiments of the present invention may be downloaded to persistent storage 805 through communications unit 807.

I/O interface(s) 806 enables for input and output of data with other devices that may be connected to each computer system. For example, I/O interface 806 may provide a connection to external devices 808 such as a keyboard, keypad, a touch screen, and/or some other suitable input device. External devices 808 may also include portable computer readable storage media such as, for example, thumb drives, portable optical or magnetic disks, and memory cards. Software and data used to practice embodiments of the present invention may be stored on such portable computer readable storage media and may be loaded onto persistent storage 805 via I/O interface(s) 806. PO interface(s) 806 also connect to display 809.

Display 809 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for optimizing file recall for multiple users, the computer-implemented method comprising:
   obtaining one or more similarities among a plurality of users based on one or more usage points;
   dividing the a plurality of users into a plurality of clusters based on a content of the one or more usage points within a predetermined period of time wherein dividing the plurality users into a plurality of clusters comprises:

identifying one or more similarities among the plurality of users based on the usage points and dividing the users into a plurality of clusters based on the obtained similarities;

selecting a cluster from the plurality of clusters for automated recall based on cluster importance, wherein the cluster importance is obtained by analyzing the a plurality of users pertaining to the cluster and a ratio of weighted users;

selecting the content used by more than a predetermined percentage of the weighted users pertaining to the selected cluster as an automated recall subject;

recalling, based on a file usage history of the plurality of users, a file that has been subjected to automated recall through hierarchical storage management; and recalling one or more selected content from a secondary storage device to a primary storage device.

2. The computer-implemented method of claim 1, further comprising:

determining a candidate file for automated recall, based on usage history of files pertaining to the selected cluster and capacity of the primary storage device for reducing access time of one or more requested files; and obtaining a usage count of the content associated with the one or more users within a fixed period, and assigning a usage point to each content used based on the obtained usage count.

3. The computer-implemented method of claim 1, further comprising:

outputting, by a user interface, the selected content to the weighted users.

4. The computer-implemented method of claim 1, further comprising:

clustering by creating a matrix of usage points of respective users and files based on a usage file count by each user within a predetermined fixed period of time.

5. The computer-implemented method of claim 1, further comprising:

creating a vector for usage points of one or more files from the one or more users to calculate the one or more similarities among the one or more users so that one or more users with the one or more similarities above or within a predetermined range are consolidated into a common cluster, wherein the one or more users overlap across one or more clusters.

6. The computer-implemented method of claim 1, further comprising:

generating a ranked list of the one or more selected content; and displaying, by a user interface, a responsive prompt detailing the generated list to the one or more users, wherein the responsive prompt requests the one or more users to confirm, reject, or customize the generated ranked list of the one or more selected content.

7. The computer-implemented method of claim 6, further comprising:

responsive to receiving a response from the one or more users to customize the generated list, enabling, by the user interface, the one or more users to customize and confirm the generated list.

8. A computer system for optimizing file recall for multiple users, the computer system comprising:

one or more computer processors;

one or more computer readable storage devices;

program instructions stored on the one or more computer readable storage devices for execution by at least one of the one or more computer processors, the stored program instructions comprising:

program instructions to divide the a plurality of users into a plurality of clusters based on a content of the one or more usage points within a predetermined period of time wherein dividing the plurality users into a plurality of clusters comprises:

program instructions to identify one or more similarities among the plurality of users based on the usage points and dividing the users into a plurality of clusters based on the obtained similarities;

program instructions to select a cluster from the plurality of clusters for automated recall based on cluster importance, wherein the cluster importance is obtained by analyzing the a plurality of users pertaining to the cluster and a ratio of weighted users;

program instructions to select the content used by more than a predetermined percentage of the weighted users pertaining to the selected cluster as an automated recall subject;

program instructions to recall, based on a file usage history of the plurality of users, a file that has been subjected to automated recall through hierarchical storage management; and program instructions to recall one or more selected content from a secondary storage device to a primary storage device.

9. The computer system of claim 8, further comprising:

program instructions to determine a candidate file for automated recall, based on usage history of files pertaining to the selected cluster and capacity of the primary storage device for reducing access time of one or more requested files; and program instructions to obtain a usage count of the content associated with the one or more users within a fixed period, and assigning a usage point to each content used based on the obtained usage count.

10. The computer system of claim 8, further comprising:

program instructions to output, by a user interface, the selected content to the weighted users.

11. The computer system of claim 8, further comprising:

program instructions to cluster by creating a matrix of usage points of respective users and files based on a usage file count by each user within a predetermined fixed period of time.

12. The computer system of claim 8, further comprising:

program instructions to create a vector for usage points of one or more files from the one or more users to calculate the one or more similarities among the one or more users so that one or more users with the one or more similarities above or within a predetermined range are consolidated into a common cluster, wherein the one or more users overlap across one or more clusters.

13. The computer system of claim 8, further comprising:

program instructions to generate a ranked list of the one or more selected content; and program instructions to display, by a user interface, a responsive prompt detailing the generated list to the one or more users, wherein the responsive prompt requests the one or more users to confirm, reject, or customize the generated ranked list of the one or more selected content.

14. The computer system of claim 13, further comprising:

responsive to receiving a response from the one or more users to customize the generated list, program instructions to enable, by the user interface, the one or more users to customize and confirm the generated list.

15. A computer program product for optimizing file recall for multiple users, the computer program product comprising:
one or more computer readable storage devices and program instructions stored on the one or more computer readable storage devices, the stored program instructions comprising:
program instructions to divide the a plurality of users into a plurality of clusters based on a content of the one or more usage points within a predetermined period of time wherein dividing the plurality users into a plurality of clusters comprises:
program instructions to identify one or more similarities among the plurality of users based on the usage points and dividing the users into a plurality of clusters based on the obtained similarities;
program instructions to select a cluster from the plurality of clusters for automated recall based on cluster importance, wherein the cluster importance is obtained by analyzing the a plurality of users pertaining to the cluster and a ratio of weighted users;
program instructions to select the content used by more than a predetermined percentage of the weighted users pertaining to the selected cluster as an automated recall subject;
program instructions to recall, based on a file usage history of the plurality of users, a file that has been subjected to automated recall through hierarchical storage management; and
program instructions to recall one or more selected content from a secondary storage device to a primary storage device.

16. The computer program product of claim 15, further comprising:
program instructions to determine a candidate file for automated recall, based on usage history of files pertaining to the selected cluster and capacity of the primary storage device for reducing access time of one or more requested files; and
program instructions to obtain a usage count of the content associated with the one or more users within a fixed period, and assigning a usage point to each content used based on the obtained usage count.

17. The computer program product of claim 15, further comprising:
program instructions to output, by a user interface, the selected content to the weighted users.

18. The computer program product of claim 15, further comprising:
program instructions to cluster by creating a matrix of usage points of respective users and files based on a usage file count by each user within a predetermined fixed period of time.

19. The computer program product of claim 15, further comprising:
program instructions to create a vector for usage points of one or more files from the one or more users to calculate the one or more similarities among the one or more users so that one or more users with the one or more similarities above or within a predetermined range are consolidated into a common cluster, wherein the one or more users overlap across one or more clusters.

20. The computer program product of claim 15, further comprising:
program instructions to generate a ranked list of the one or more selected content;
program instructions to display, by a user interface, a responsive prompt detailing the generated list to the one or more users, wherein the responsive prompt requests the one or more users to confirm, reject, or customize the generated ranked list of the one or more selected content; and
responsive to receiving a response from the one or more users to customize the generated list, program instructions to enable, by the user interface, the one or more users to customize and confirm the generated list.

* * * * *